United States Patent
Wang et al.

(10) Patent No.: US 7,202,913 B2
(45) Date of Patent: Apr. 10, 2007

(54) CONTROLLING ON-SCREEN DISPLAYS

(75) Inventors: Guo Ji Wang, Singapore (SG); Boon Leong Tay, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 474 days.

(21) Appl. No.: 10/484,353

(22) PCT Filed: Jul. 17, 2002

(86) PCT No.: PCT/IB02/03089

§ 371 (c)(1),
(2), (4) Date: Jan. 20, 2004

(87) PCT Pub. No.: WO03/010959

PCT Pub. Date: Feb. 6, 2003

(65) Prior Publication Data

US 2004/0179138 A1   Sep. 16, 2004

(30) Foreign Application Priority Data

Jul. 24, 2001   (SG)   .................... PCT/SG01/00156

(51) Int. Cl.
H04N 5/50 (2006.01)
(52) U.S. Cl. .................. 348/570; 348/569; 348/732
(58) Field of Classification Search ............... 348/570, 348/732, 569, 731; 725/72; 455/154.1, 455/154.2, 161.1, 161.3
See application file for complete search history.

(56) References Cited

U.S. PATENT DOCUMENTS

| 4,205,347 | A | * | 5/1980 | Minoura et al. ............ 348/731 |
| 4,317,225 | A | * | 2/1982 | Henderson et al. ...... 455/154.2 |
| 4,357,632 | A | * | 11/1982 | French ...................... 348/732 |
| 4,366,502 | A | * | 12/1982 | Shiu .......................... 348/570 |
| 4,598,317 | A | * | 7/1986 | Yu ............................ 348/570 |
| 4,677,484 | A | * | 6/1987 | Pitsch et al. ............... 348/533 |
| 5,103,313 | A | * | 4/1992 | Chan et al. ................ 348/570 |
| 5,237,443 | A | * | 8/1993 | Kurisu et al. .............. 348/570 |
| 6,529,246 | B1 | * | 3/2003 | Maeda ........................ 348/570 |
| 6,600,522 | B1 | * | 7/2003 | Kim ........................... 348/732 |

* cited by examiner

Primary Examiner—Victor R. Kostak

(57) ABSTRACT

An apparatus for controlling synchronization of on-screen display information in an auto-search mode of a radio-frequency receiver (2) connected to scan an incoming signal for valid channel frequencies, includes a picture intermediate frequency phase-locked loop detector (17) for supplying an output signal indicating whether an intermediate frequency demodulator is in an unlocked mode which is the case if the incoming signal frequency does not correspond to a valid channel frequency, or in a locked mode, which is the case if the incoming signal frequency does correspond to a valid channel frequency, a video detector (18) for detecting a video property in the incoming signal, a synchronization phase control loop (6, 8, 10) which is closed if the video property is detected and the output signal indicates the locked mode, a memory for storing the frequency of the incoming signal as a valid channel when the phase control loop (6, 8, 10) is closed, and a horizontal oscillator (8) connected to free run when the phase control loop (6, 8, 10) is open. This stabilizes an on-screen display even when no signal is present or a weak signal is present.

7 Claims, 5 Drawing Sheets

CONTROLLING ON-SCREEN DISPLAYS

BACKGROUND OF THE INVENTION

1. Field of the Invention

The present invention relates to on-screen displays, particularly such displays as are commonly used on the picture screen when a television tuner is in the auto-search mode.

2. Description of the Related Art

An On-screen display (OSD) typically comprises alpha-numeric and/or picture characters to provide information to the user, for example, regarding channel number, programming choices, and prompting statements. Typically, the OSD signals are supplied to the luminance/chrominance processing part of the television receiver to be displayed on the screen superimposed on any picture signal received by the tuner. To ensure that the OSD always appears in the same position on the screen, it is synchronized with the horizontal and vertical deflection timing pulses which are separated in the receiver from the received television signal.

A problem arises when an OSD is required at a time when no picture signal is being received, for example, during tuning, or if the picture signal is weak. Then either no timing pulses are present or the timing pulses are very noisy because of residual harmonics which appear as false video synchronizing signals at the output of the picture intermediate frequency demodulator (further referred to as "PIF demodulator") which demodulates the intermediate frequency supplied by a tuner into a baseband video signal. This tends to produce disturbances and distortion in the OSD, including jagged edges and vertical bounce because the position of the OSD characters will tend to vary from line to line and from field to field. This is evidently undesirable. The problem is particularly acute during an auto search tuning mode of a television receiver.

It has been proposed to use a substitute synchronizing signal in circumstances when no suitable external signal is being received. This increases the cost of the receiver. Alternatively, U.S. Pat. No. 4,677,484 proposes a dedicated deflection signal source and control means to switch the source from an operating mode, in which it is synchronized with a received synchronizing signal, to a mode in which it is free running, when the incoming signal is determined to have an invalid or unsuitable synchronizing signal. This again requires expensive additional circuitry.

SUMMARY OF THE INVENTION

It is an object of the invention to provide an on-screen display which obviates the above-mentioned problems. This object is achieved in an apparatus for controlling synchronization of on-screen display information in an auto-search mode of a radio-frequency receiver connected to scan an incoming signal for valid channel frequencies, the apparatus comprising a detector for supplying an output signal indicating whether an intermediate frequency demodulator is in an unlocked mode, which is the case if the incoming signal frequency does not correspond to a valid channel frequency, or in a locked mode, which is the case if the incoming signal frequency does correspond to a valid channel frequency; a video detector for detecting a video property in the incoming signal; a synchronization phase control loop which is closed if the video property is detected and the output signal indicates the locked mode; a memory for storing the frequency of the incoming signal as a valid channel frequency when the synchronization phase control loop is closed; and a horizontal oscillator connected to free run when the synchronization phase control loop is open.

There is preferably also a coincidence detector to verify the coincidence detection status to confirm the presence of a valid channel frequency indicating a real transmission.

According to a preferred embodiment, the video property is a line frequency signal and the memory may be non-volatile.

According to a second aspect of the present invention, a method is provided for controlling synchronization of on-screen display information in the auto-search mode of a radio-frequency receiver connected to scan an incoming signal for valid channel frequencies, the method comprising the steps of:

(a) initiating a channel frequency search mode;

(b) opening a synchronization phase control loop and setting a horizontal oscillator to free run, for example, by switching a vertical divider in the auto mode;

(c) generating on-screen display information, preferably for a full screen;

(d) scanning an incoming signal for valid channel frequencies;

(e) monitoring the incoming signal for the presence of a video property;

(f) if the video property is detected, causing the program to wait only for a predetermined time; if the video property is not detected proceed to step (j);

(g) checking the lock status of the PIF phase-locked loop;

(h) closing the synchronization phase control loop only if the PIF phase locked loop is locked (or more general, if the PIF demodulator does not comprise a phase locked loop, when a detector coupled to the PIF demodulator detects a locked state indicating that it is very likely that a valid channel frequency is detected;

(i) then storing the data if the PIF phase locked loop is locked and the video property is present;

(j) seeking the next channel and proceeding with step b) as long as not all channels have been searched.

The channel frequency data is preferably stored in a non-volatile memory, and the video property is preferably a line frequency signal.

The accuracy of detecting a channel can be further improved by checking the output of a coincidence detector coupled to the phase control loop. In this embodiment the coincidence detector outputs a logical true or false signal, depending on whether or not the synchronization phase control loop, while being closed, is synchronizing the horizontal oscillator with the incoming RF signal. If the output is "true", a valid channel frequency is detected and is stored in a non-volatile memory. If "false", there is not detected a valid channel frequency, so this frequency is not stored.

BRIEF DESCRIPTION OF THE DRAWINGS

These and other aspects of the invention will be apparent from and elucidated with reference to the accompanying drawings, in which.

DESCRIPTION OF THE PREFERRED EMBODIMENTS

Figure 1:
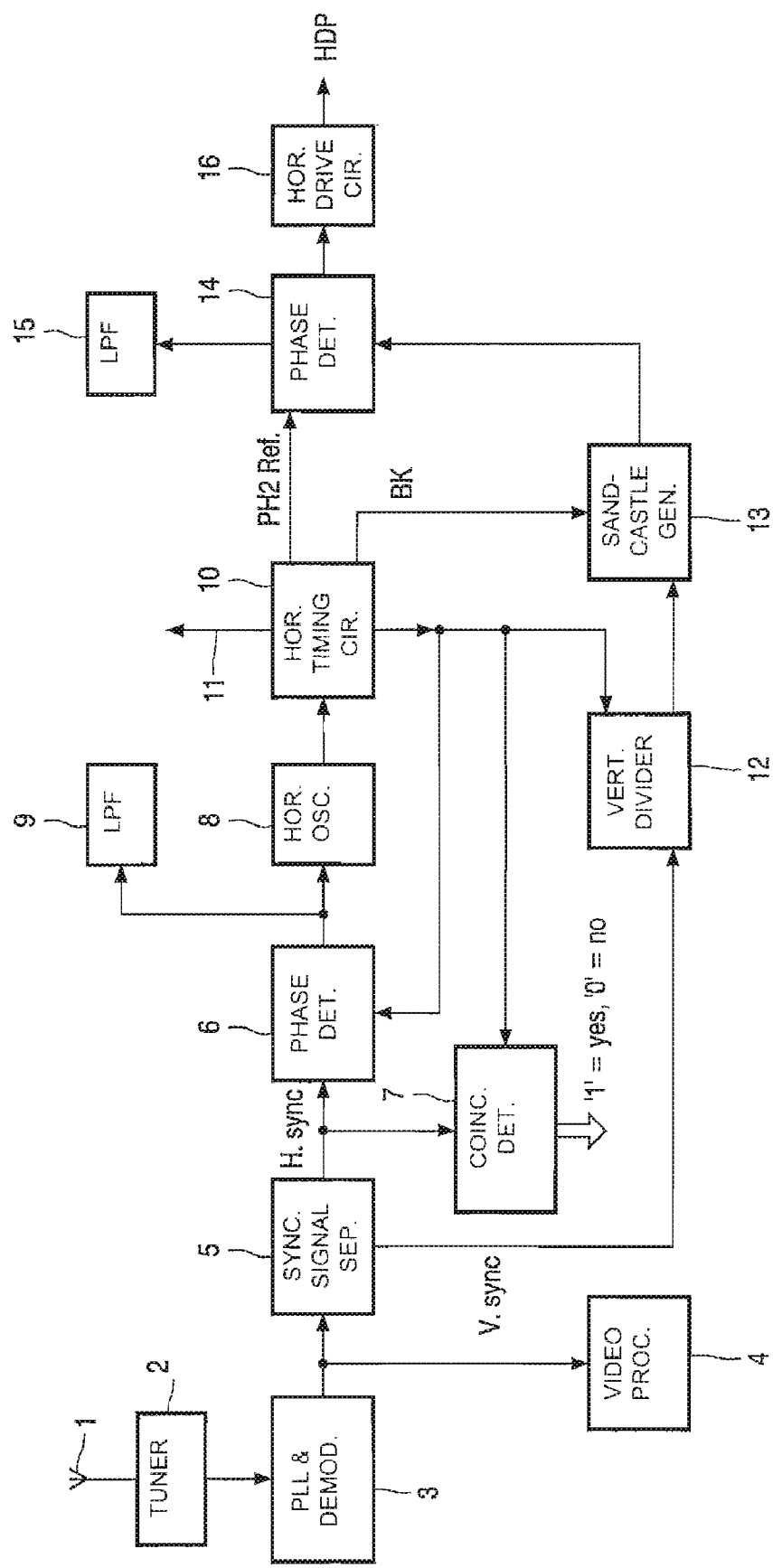
FIG. 1 is a schematic block diagram illustrating a prior art apparatus and method of synchronizing on-screen displays.

In FIG. 1, a schematic block diagram of a known apparatus is shown in which an incoming radio frequency (RF) signal is received by an aerial 1 and passed to a television tuner 2. In known manner, the RF signal passes through a picture intermediate frequency phase-locked loop demodulator circuit (PIF PLL) 3 which demodulates the received signal to separate it into the constituent video signal and synchronizing signal. The video signal is passed to a video processor 4 and the synchronizing signal is applied to a synchronizing signal separator 5. The separator 5 may divide the horizontal synchronizing signal H.sync from the vertical synchronizing signal V.sync. The horizontal signal H.sync is applied to a first phase detector 6 and to a coincidence detection circuit 7, again in known manner. The output of the first phase detector 6 is filtered via a low-pass filter 9 and fed to a horizontal oscillator 8 which, in turn, supplies horizontal timing circuitry 10, to provide a horizontal display timing signal 11, a second phase reference signal (PH2 Ref), and a Burst-key signal BK.

The vertical signal V.sync is output to a vertical divider 12 and subsequently to a sandcastle generator 13, which also receives the Burst-key signal BK from the horizontal timing circuitry 10.

A second phase detection circuitry 14 receives the second phase reference signal PH2 Ref and the output signal from the sandcastle generator 13, which also provides the horizontal fly-back pulse. The output of the second phase detection circuitry 14 is filtered via a second low-pass filter 15 and coupled to the horizontal drive circuitry 16 which generates a horizontal drive pulse HDP.

Figure 2:
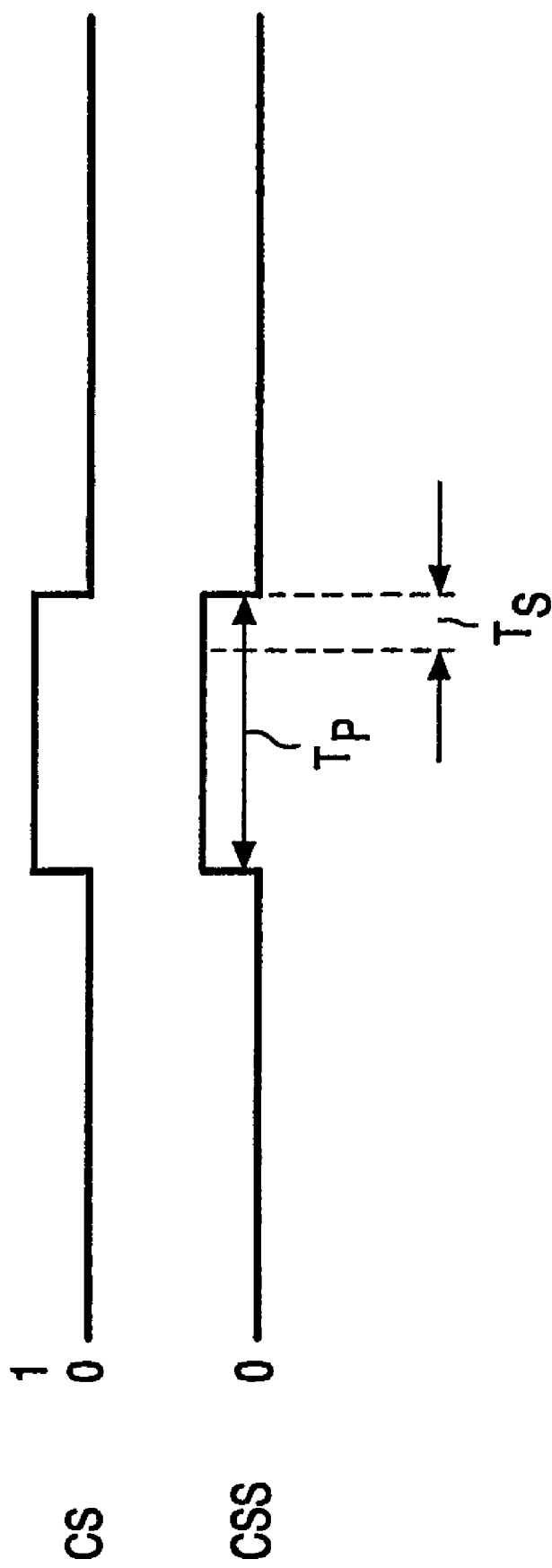
FIG. 2 is a timing sequence diagram for the signal flow chart of FIG. 1.

FIG. 2 is a timing diagram showing the correspondence between the coincidence status CS of the coincidence detection circuit 7 and the channel search status CSS. When the coincidence status CS changes from zero to one indicating that, while scanning the channel frequencies, a channel has been found, the scanning of channel frequencies is paused during a time period Tp (indicated with status "1" in the channel search status CSS diagram). During this pause, the accurate channel frequency is detected and subsequently stored during storing time Ts in a memory. Thereafter, the channel search status becomes zero again, and the scanning of channel frequencies is resumed until a next channel is found.

Figure 3:
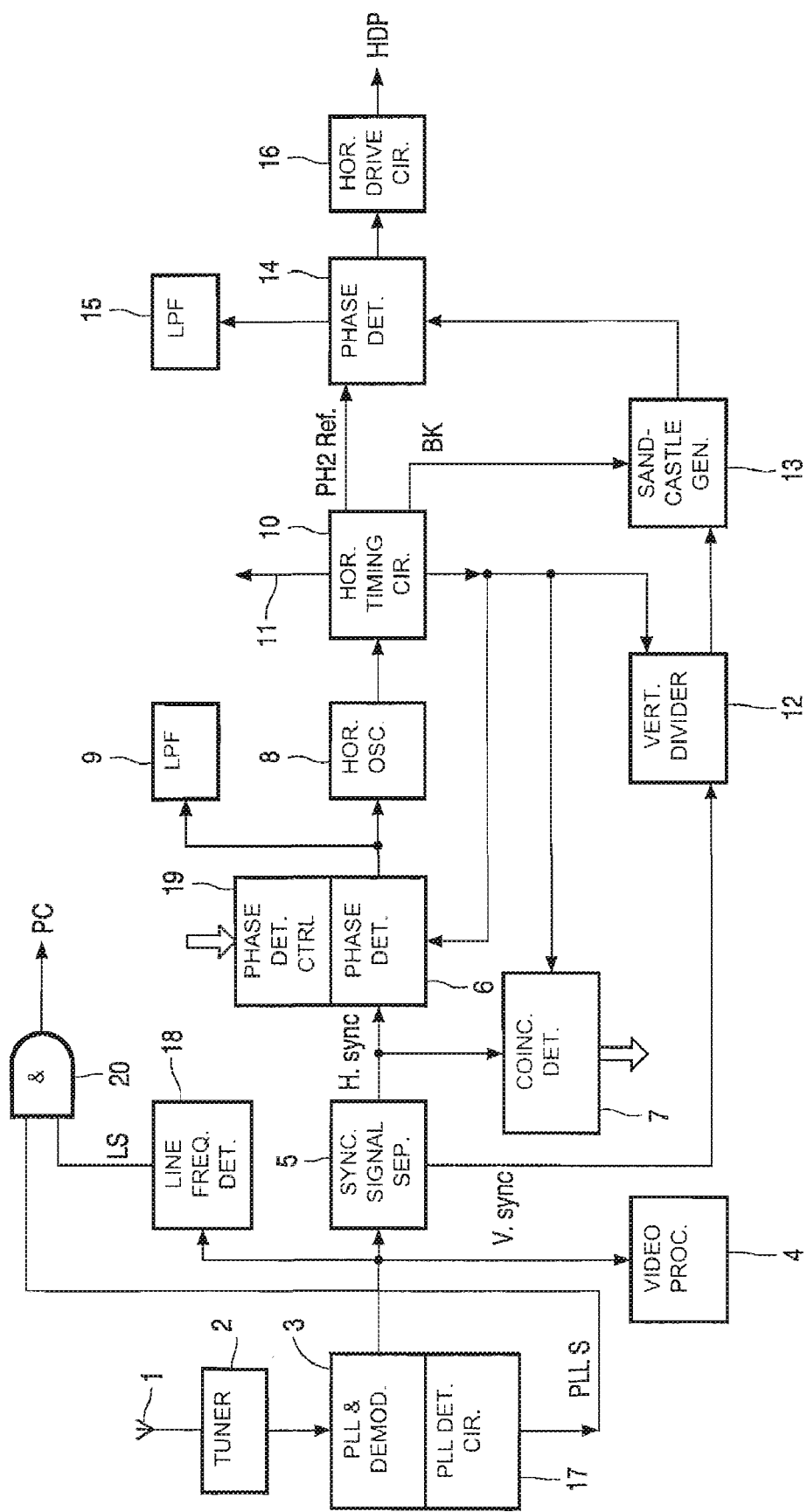
FIG. 3 is a schematic block diagram illustrating an apparatus and a method according to the present invention.

FIG. 3 is a schematic block diagram of an apparatus and a method according to the present invention. All of the known blocks illustrated in FIG. 1 are also present in this diagram, but in addition, extra stages, including a phase-locked loop (PLL) detection circuit 17, a line frequency detection circuit 18, and a first phase detector control circuit 19, are provided as described below.

The PLL detection circuit 17 determines whether the PIF PLL 3 is in a locked state. An output "1" indicates that it is in a locked state, whereas a "0" indicates that it is in an unlocked state.

The line frequency detection circuit 18 determines whether the incoming RF signal received by the aerial 1 has a video property, and thus whether a valid picture signal is being received. The line frequency detection circuit 18 detects the line frequency and, if it is present, it is likely that a TV broadcast signal is being received and it is thus desirable to store information related to this signal in the memory (not shown). Thus, the detection circuit 18 outputs a logic "1". If the line frequency is not detected, the detection circuit 18 outputs a logic "0". The line frequency is actually 15,625 Hz for the European Standards. The line frequency may have another value which is depending on the broadcast system (for example, about 31 kHz or 32 kHz for HDTV). Instead of the line detection circuit 18, also other video property detection circuits can be used, indicating the presence of a video signal.

Further logic circuitry in the form of an AND gate 20, assesses the outputs of the PLL detection circuit 17 and the line detection circuit 18 and provides a control signal to the first phase detector control circuit 19, accordingly. This control signal can be supplied directly to the control circuit 19 or via a processor (not shown) which controls the execution of the method. Also, the function of the AND gate 20 can be performed by the processor. Specifically, if the PLL is in lock and a video property is detected, the logic outputs of the detection circuits 17 and 18 will both be "1" and as a result a logic "1" is supplied to the first phase detector control circuit 19 to close the phase control loop 6, 8, 10 and enable the first phase detector to pass the horizontal synchronization signal H.sync for synchronization of the OSD display with the incoming signal.

On the other hand, if the PLL detection circuit 17 does not indicate a "Lock" or if there is no video property in the incoming signal, a logic "0" is supplied to the first phase detector control circuit 19 to open the phase control loop 6, 8, 10 and allow the horizontal oscillator 8 to free-run, thus avoiding interference to the OSD display by poorly received signals.

Figure 4:
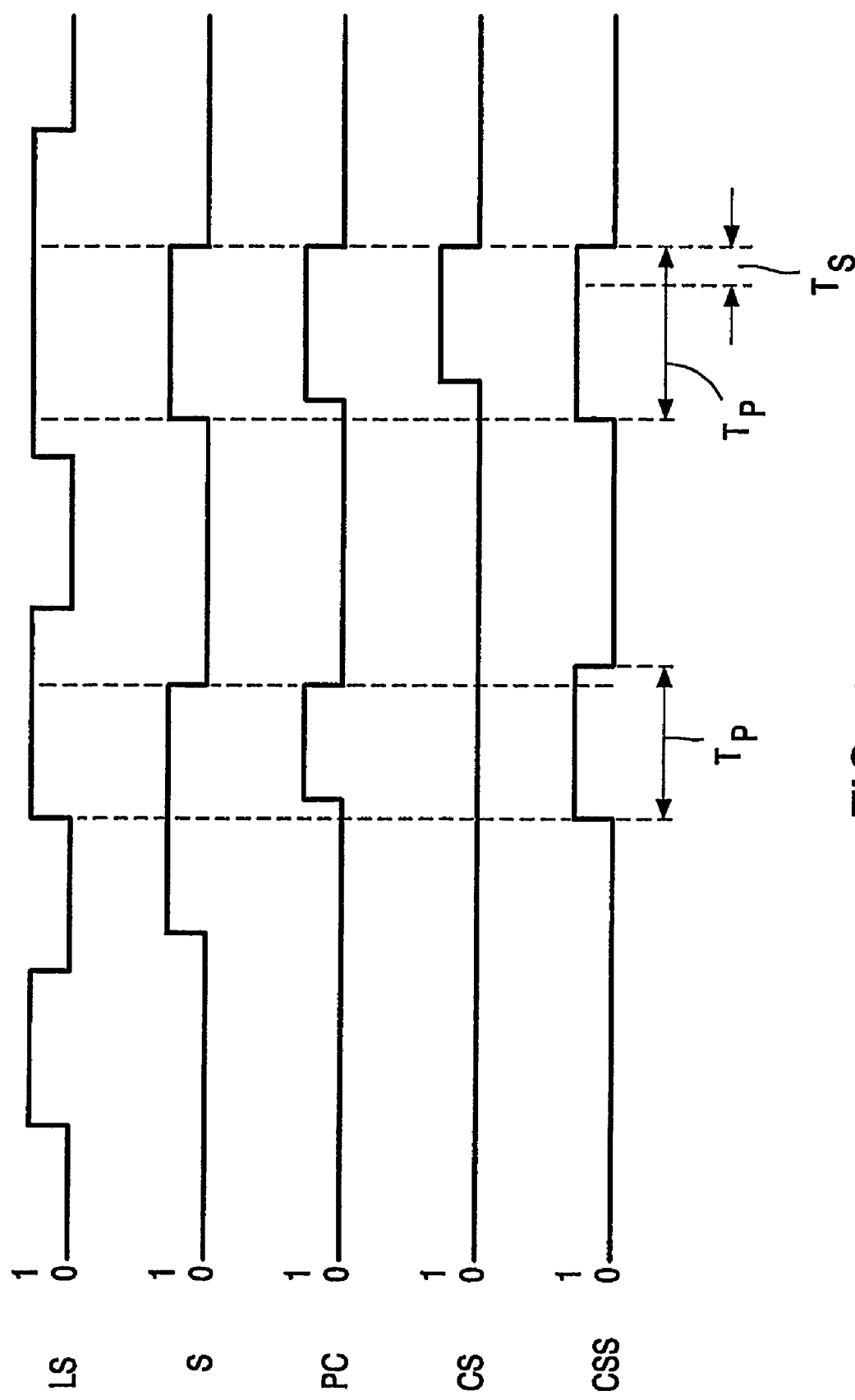
FIG. 4 is a timing sequence diagram for the signal flow chart of FIG. 3.

The switching timing of the following signals can be seen in FIG. 4:

the status signal Ls of the output of the line detection circuit 18, the status signal PLL-S of the output of the PLL detection circuit 17, the status signal PC supplied to the first phase detector control circuit 19, the status signal CS of the output of the coincidence detection circuit 7, and the signal indicating the channel search status CSS.

When both status signals LC and PLL-S are "1", the first phase control circuit 19 receives the status signal PC equal to "1". While status PC equals "1", the channel search is paused during the time Tp as indicated with status "1" of status signal CSS. During this time, the control circuit 19 closes the phase locked loop comprising the first phase detector 6, the horizontal oscillator 8 and horizontal timing 10. This allows the coincidence detection circuit 7 to detect whether synchronization of the horizontal oscillator 8 with the incoming RF signal has been achieved (indicated with status "1" of status signal Cs). If yes, the presence of a channel is confirmed and the channel frequency is stored during storing time Ts. Thereafter, the next channel is searched (indicated by status "0" of status signal CSS).

Figure 5:
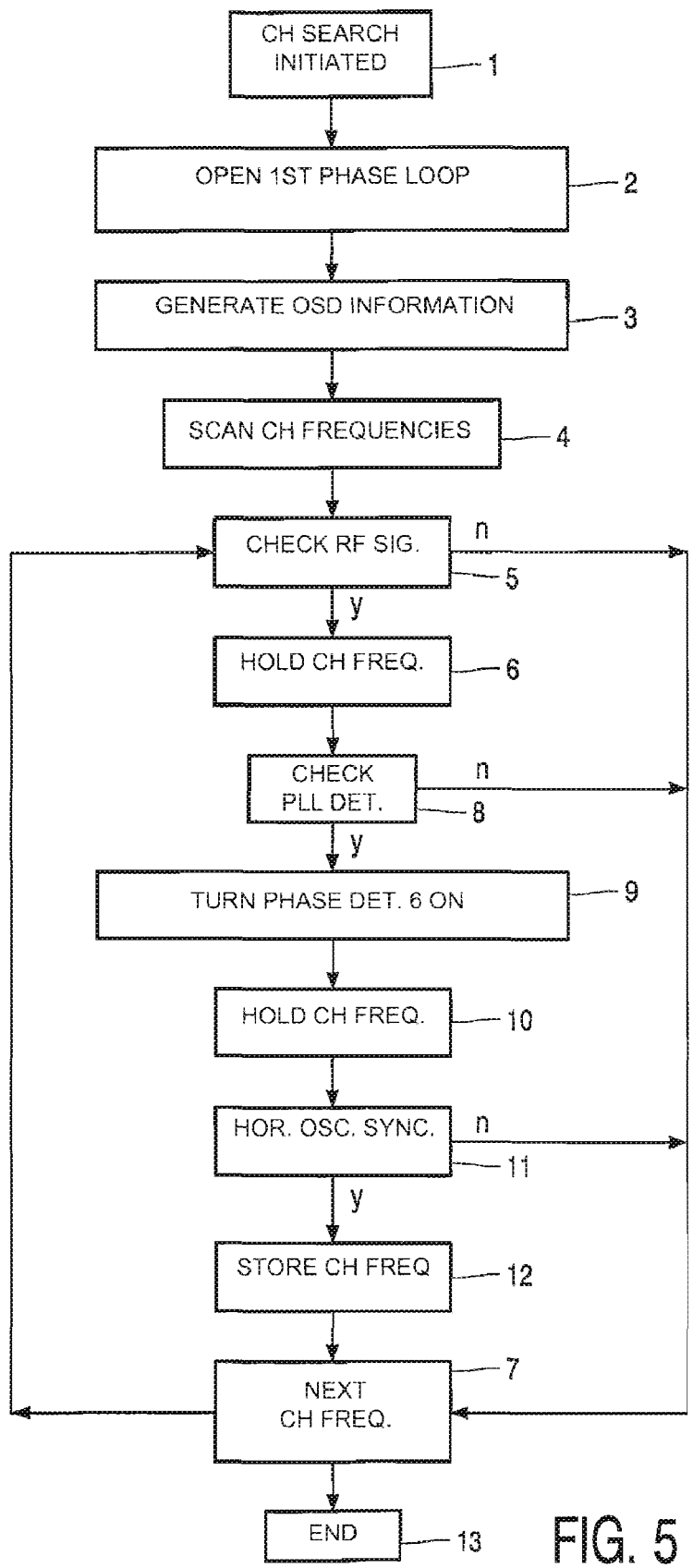
FIG. 5 is a flowchart illustrating one software implementation of the invention.

FIG. 5 provides a flowchart illustrating the method of the subject invention and a software implementation covering the channel installation and comprising the following steps:

1. Channel search mode is initiated.

2. The first phase loop 6, 8, 10 is opened (meaning the horizontal oscillator 8 is free-running) and the vertical divider 12 is set in the auto mode.

3. OSD information is generated (preferably for a full screen).

4. The tuner starts to scan the channel frequencies for an incoming RF signal.

5. The RF signal is checked whether it comprises a line frequency signal, indicative of a video property.

7. If the line frequency is not detected, the next channel frequency is selected and step 5 repeated until a last channel frequency has been checked, 6. If the line frequency signal is detected, the channel frequency is kept constant for a predetermined pause time Tp.

8. The status of the PLL detection circuit 17 is checked

9. If the PLL detection circuit 17 is locked, the first phase detector 6 is switched on, (If not, the program proceeds with step 7).

10. The channel frequency is kept constant (allowing the coincidence detector to reach a final value).

11. The coincidence detection circuit 7 assesses whether the horizontal oscillator 8 is synchronized with the incoming RF signal.

12. If yes, the frequency of the incoming RF signal is stored in a non-volatile memory (NVM) (not shown) and the next channel is selected in step 7. If no synchronization is detected the method proceeds immediately to step 7.

13. The program ends when all channels have been scanned.

The IC TDA957X H/N1 is a known TV signal processor which has a closed caption decoder with an embedded micro-controller. This processor can be applied to the apparatus and the method of the present invention and, for example, programmed in accordance with the flowchart of FIG. 5 in a manner which will be evident to a skilled person in this field. It should be noted that the invention could also be carried into effect by programming any one of several similar known processors or other circuitry and the invention is not intended to be limited to this illustrated circuit.

The invention is applicable to traditional television receivers and also to personal computers equipped with a television function.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An apparatus for controlling synchronization of on-screen display information in an auto-search mode of a radio-frequency receiver connected to scan an incoming signal for valid channel frequencies, the apparatus comprising:
    a detector for supplying an output signal indicating whether an intermediate frequency demodulator is in an unlocked mode, which is the case if the incoming signal frequency does not correspond to a valid channel frequency, or in a locked mode, which is the case if the incoming signal frequency does correspond to a valid channel frequency;
    a video detector for detecting a video property in the incoming signal;
    a synchronization phase control loop which is closed if the video property is detected and the output signal indicates the locked mode;
    a memory for storing the frequency of the incoming signal as a valid channel frequency when the synchronization phase control loop is closed; and
    a horizontal oscillator connected to free run when the synchronization phase control loop is open.

2. The apparatus as claimed in claim 1, wherein the video property to be detected comprises a line frequency signal.

3. The apparatus as claimed in claim 1, wherein said apparatus further comprises:
    a coincidence detection circuit for verifying a coincidence detection status to confirm the presence of a valid channel frequency, the memory storing the frequency if the coincidence detection circuit confirms the presence of a valid channel.

4. A method of controlling synchronization of on-screen display information in the auto-search mode of a radio-frequency receiver, the method comprising the step of:
    (a) initiating a channel frequency search mode;
    (b) opening a synchronization phase control loop and setting a horizontal oscillator to a free running mode;
    (c) generating on-screen display information;
    (d) scanning an incoming signal for valid channel frequencies;
    (e) closing the phase control loop and pausing the scanning for a predetermined time if the incoming signal comprises a video property and an intermediate frequency phase-locked loop is locked;
    (f) storing channel data while the phase control loop is closed;
    (g) scanning for the next channel.

5. The method as claimed in claim 4, wherein the video property to be detected is a line synchronizing signal.

6. A TV signal processor comprising means for carrying out the method of claim 4.

7. A television apparatus comprising the apparatus of claim 1 and a display device for displaying the on-screen display information.

* * * * *